United States Patent [19]

Urwyler

[11] 3,760,080

[45] Sept. 18, 1973

[54] PHENYLBUTAZONE-SODIUM-MONOGLYCERATE IN THE TREATMENT OF INFLAMMATION

[75] Inventor: Heinrich Urwyler, Reinach/Basel-Lands, Switzerland

[73] Assignee: Ciba-Geigy Corporation, Ardsley, N.Y.

[22] Filed: Sept. 17, 1971

[21] Appl. No.: 181,629

Related U.S. Application Data

[62] Division of Ser. No. 882,693, Dec. 5, 1969, Pat. No. 3,644,395.

[52] U.S. Cl. .............................................. 424/273
[51] Int. Cl. ............................................. A61k 27/00
[58] Field of Search .................................... 424/273

[56] References Cited
UNITED STATES PATENTS

| | | | |
|---|---|---|---|
| 2,562,830 | 7/1951 | Stenzl | 260/210 |
| 3,487,046 | 12/1969 | Negrevergne | 260/51.5 |
| 3,491,190 | 1/1970 | Rumpf et al. | 424/270 |

FOREIGN PATENTS OR APPLICATIONS 4,183  5/1966  France ............................ 260/311

Primary Examiner—Stanley J. Friedman
Attorney—Joseph G. Kolodny

[57] ABSTRACT

Phenylbutazone-sodium-monoglycerate is prepared in crystalline form; the compound is comprised in pharmaceutical compositions and has advantageous properties in the treatment of inflammatory diseases.

2 Claims, No Drawings

PHENYLBUTAZONE-SODIUM-MONOGLYCERATE IN THE TREATMENT OF INFLAMMATION

CROSS-REFERENCE TO RELATED APPLICATION

This is a divisional of Ser. No. 882,693, filed Dec. 5, 1969, now U. S. Pat. No. 3,644,395.

DETAILED DESCRIPTION

The present invention relates to a crystal compound of phenylbutazone, a process for the production thereof, as well as medicaments containing the compound and their use.

It is known that the antirheumatically active substance 4-n-butyl-1,2-diphenyl-3,5-pyrazolidinedione for which in the following the generic name phenylbutazone is used, forms with inorganic and organic bases, by virtue of the 3,5-dicarbonyl grouping, watersoluble salts. The aqueous solution of the pharmaceutically acceptable sodium salt has for a long time been used for intramuscular injection. On the other hand, the sodium salt, by reason of its poor crystallising property and its hygroscopicity, together with the associated difficulty of obtaining exact dosages, and also by reason of its low storage stability, is very unsuitable for the production of solid oral dosage units such as tablets, dragees and capsules. Moreover, it is likewise unsuitable as active substance for the production of dry ampoules in any way other than by the relatively expensive process of dry freezing (lyophilisation) the individual ampoules. Furthermore, the purity of the sodium salt can at the most only correspond to that of the starting materials used to form the salt, when the sodium salt is produced, e.g., by concentrating by evaporation its ethanolic solution, prepared from equimolecular amounts of phenylbutazone and sodium ethylate, or by concentrating by evaporation its aqueous solution, prepared from phenylbutazone and sodium hydroxide solution; no further purification is obtainable by recrystallisation of the sodium salt.

Surprisingly, it has now been found that equimolecular amounts of phenylbutazone ions, sodium ions and glycerin form a very well crystallising compound of phenylbutazone-sodium-monoglycerin of the formula I

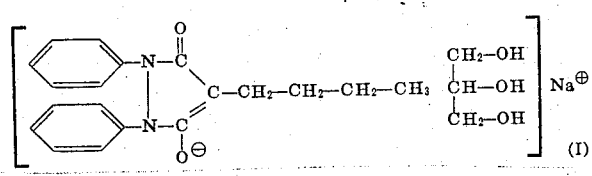

This formula is meant to indicate only that, in the stated crystal compound, the sodium is present as a cation and the phenylbutazone as an anion, and that the ratio of the 3 components is equimolar. It is, however, thereby not defined, in what proportion of the mesomeric forms:

the anion of the phenylbutazone is present.

The crystal compound of the formula I, i.e., the phenylbutazone-sodium-monoglycerate, crystallises well from organic and organic-aqueous solvents and can therefore easily be obtained in pure form. On the other hand, it is readily soluble in water, is reabsorbed well by mammals and is also suitable for the rapid preparation of aqueous solution of the sodium salt of phenylbutazone, e.g., as the active substance for dry ampoules. The crystal compound of the formula I also has good stability in storage and is only slightly hygroscopic. It can therefore be weighed off satisfactorily and is miscible with the usual carriers for solid oral dosage units, so that it is extremely suitable as active substance for such oral preparations.

Using the process according to the invention, the phenylbutazone-sodium-monoglycerate of the formula I is produced by reacting phenylbutazone of the formula II with glycerin and a substance releasing sodium ions, with a pH-value above 7, optionally in the presence of organic or organic/aqueous solvents, separating the phenylbutazone-sodium-monoglycerate which has precipitated in crystalline form and, optionally, recrystallising it from a suitable solvent.

The reaction is performed using dissociating sodium compounds with any anion, but preferably with anions which form weaker acids than the phenylbutazone. It is possible to use, e.g., sodium hydroxide solution, sodium carbonate, sodium alkanolates such as, e.g., sodium ethanolate or a glycerin sodium salt.

The smooth course of the reaction is not impeded by the addition of solvents such as water, lower alkanols such as, e.g., ethanol or isopropanol, as well as aromatic solvents such as, e.g., benzene or toluene, or mixtures of these solvents, provided that the concentration does not fall below the solubility product of the phenylbutazone-sodium-monoglycerate.

The precipitation of the phenylbutazone-sodium-monoglycerate occurs as soon as the three reactants, phenylbutazone, sodium ions and glycerin, come together in alkaline medium, in any sequence or simultaneously and in sufficient concentration, whereby the minimum concentration to be exceeded is affected by the type and amount of the solvent.

Thus, the phenylbutazone can for example be suspended or dissolved in one of the stated solvents or mixtures of solvents, whereupon sodium hydroxide and glycerin can be added, successively or simultaneously, or a glycerin sodium salt.

The procedure can however be such that, for example, phenylbutazone and sodium hydroxide are together put into one of the stated solvents and then reacted with glycerin.

It is however also possible to dissolve phenylbutazone in dilute sodium hydroxide solution, in the presence or absence of solvents, and to then react the solution with glycerin.

Instead of sodium hydroxide solution, a solution of sodium in a lower alkanol can be used, which is reacted with phenylbutazone and glycerin. Alkanol and phenylbutazone can however be added to glycerin with subsequent reaction with sodium hydroxide.

A further embodiment of the process consists in adding, in a continuously operating Oslo-crystalliser, the three reactants simultaneously, in stoichiometric amounts, to the solvent or mixture of solvents, containing excess of glycerin.

The crystals, preferably precipitating upon cooling, are separated and optionally recrystallised from organic or organic-aqueous solvents or mixtures of solvents.

Suitable organic solvents are lower alkanols such as methanol, ethanol or isopropanol, and aromatic hydrocarbons such as, e.g., benzene or toluene.

In the same manner are obtained from the mother liquors, partially concentrated by evaporation, crystals of the phenylbutazone-sodium-monoglycerate.

It has now been established that the crystal compound of the formula I, according to the invention, possesses a surprisingly good reabsorbing capacity Thus, the phenylbutazone-sodium-monoglycerate attains, in the case of oral administration to dogs, a higher level in the blood than equimolecular amounts of phenylbutazone. Advantageously, the higher level in g/ml blood of the phenylbutazone-sodium-monoglycerate is attained more rapidly than with phenylbutazone. J. Pharmacol. Table The reabsorbing capacity was determined in a cross-over test on dogs. Dosages of 50 mg/kg of phenylbutazone and the equimolar amount of 68 mg/kg of phenylbutazone-sodium-monoglycerate were administered in capsules, in each case, to 10 dogs. Five dogs firstly received phenylbutazone and 3 weeks later phenylbutazone-sodium-monoglycerate, whilst the other five dogs firstly received phenylbutazone-sodium-monoglycerate and 3 weeks later phenylbutazone.

After administration of the substances, samples of blood were taken from the dogs at specified intervals of time (½, 1, 2, 3, 4, 8 and 24 hours), heparin was added and the samples were then frozen until a test series was complete. The phenylbutazone content [$\mu$/ml of blood] of each sample was determined according to the method of J. Burns et al., J. Pharmacol. Exp.-Therap. 113, 481 (1955) and the results are given in the following Tble 1 and Diagram 1.

Diagram 1 shows the mean values and standard variations of the phenylbutazone content [ $\mu$g/ml ] in the blood in relation to time. From this is seen that, after oral administration of phenylbutazonesodium-monoglycerate, the content of phenylbutazone in the blood [ $\mu$g/ml ] increases more rapidly and attains a higher value at an earlier stage than after oral administration of the equimolar amount of phenylbutazone in animal tests.

TABLE 1

Level of phenylbutazone in blood ($\mu$g/ml) in the case of dogs after oral administration of 50 mg/kg of phenylbutazone I and 68/ mg/kg of phenylbutazone-sodium-monoglycerate II

TABLE 1

[Level of phenylbutazone in blood (Fg/ml.) in the case of dogs after oral administration of 50 mg./kg. of phenylbtaone I and 68/mg.kg. of phenylbutazone-sodium-monoglycerate II]

| | Time (hours) | | | | | | |
|---|---|---|---|---|---|---|---|
| | ½ | 1 | 2 | 3 | 4 | 8 | 24 |
| Compound I; Dog: | | | | | | | |
| A | 10.6 | 9.9 | 30.7 | 59.1 | 61.7 | 84.9 | 17.5 |
| B | 22.7 | 50.9 | 84.7 | 92.1 | 125.4 | 84.7 | 8.5 |
| C | 2.8 | 1.9 | 38.7 | 66.0 | 87.2 | 69.5 | |
| D | 0 | 0 | 57.4 | 84.2 | 103.6 | 77.2 | |
| E | 10.6 | 45.9 | 93.5 | 84.7 | 105.9 | 54.7 | 6.7 |
| F | 12.2 | 40.4 | 82.8 | 89.8 | 91.6 | 52.4 | 0 |
| G | 0.5 | 29.9 | 82.4 | 78.8 | 80.6 | 71.8 | 5.7 |
| H | 48.4 | 68.8 | 65.2 | 63.0 | 59.8 | 33.0 | 4.8 |
| J | 44.1 | 51.9 | 65.6 | 67.2 | 59.0 | 66.4 | 21.5 |
| K | 54.9 | 111.1 | 148.8 | 138.2 | 138.2 | 134.7 | 35.5 |
| Mean value | 20.7 | 41.1 | 75.0 | 82.3 | 91.3 | 72.9 | 12.5 |
| Compound II; Dog: | | | | | | | |
| A | 8.4 | 5.4 | 34.9 | 63.2 | 50.5 | 86.7 | |
| B | 57.4 | 79.9 | 73.1 | 84.3 | 97.3 | 73.1 | |
| C | 47.5 | 55.4 | 89.4 | 94.9 | 54.0 | 43.4 | 9.1 |
| D | 70.8 | 104.6 | 142.4 | 106.2 | 91.3 | 91.3 | 6.2 |
| E | 23.3 | 118.6 | 141.4 | 99.3 | 143.1 | 73.1 | 20.2 |
| F | 10.5 | 27.6 | 71.3 | 71.3 | 63.6 | 60.8 | 7.5 |
| G | 42.8 | 98.0 | 107.9 | 89.8 | 83.1 | 53.7 | 7.3 |
| H | 90.6 | 102.1 | 131.9 | 113.7 | 110.4 | 65.8 | 12.9 |
| J | 24.8 | 90.7 | 137.8 | 125.3 | 103.8 | 71.7 | 15.9 |
| K | 110.0 | 123.8 | 120.9 | 106.6 | 92.3 | 79.7 | 7.2 |
| Mean value | 48.6 | 80.6 | 105.1 | 95.5 | 89.8 | 69.9 | 10.8 |

DIAGRAM 1

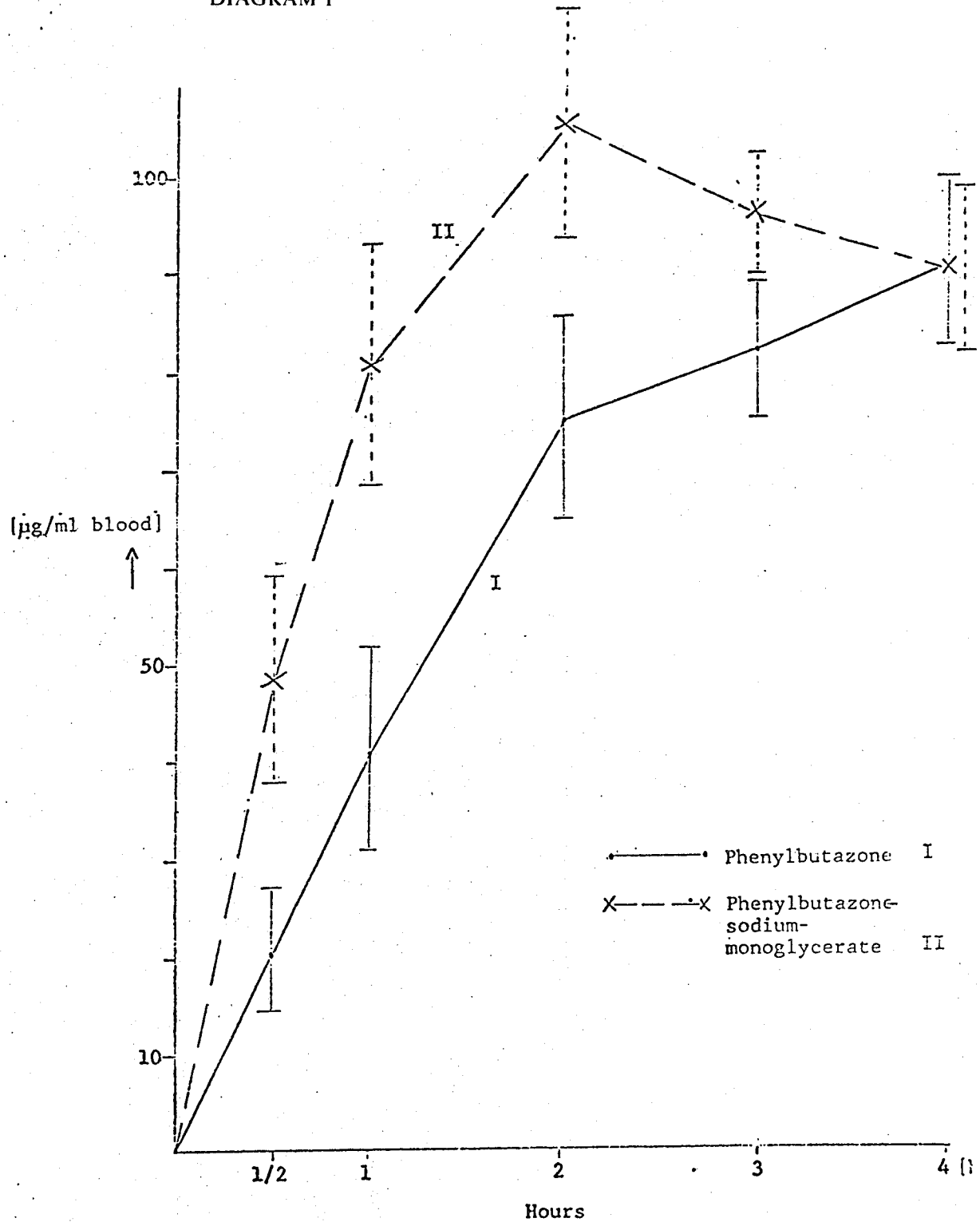

The phenylbutazone-sodium-monoglycerate is preferably administered orally or parenterally.

The daily dosages of the compound of the formula I, to be taken internally for the treatment of rheumatic, arthritic and other inflammatory diseases, vary between 150 and 1200 mg for adult patients. Suitable dosage units such as dragees, tablets and capsules, preferably contain 50–200 mg of phenylbutazone-sodium-monoglycerate.

Dosate units for oral administration preferably contain between 10 and 90 percent of active substance.

They are produced by combining the active substance, e.g., with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols having suitable molecular weights, to form tablets or dragee cores. These are coated, for example, with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g., to distinguish between varying dosages of active substance. Other suitable dosage units for oral administration are hard capsules made of gelatine, as well as soft closed capsules made of gelatine and a softener such as glycerin. The hard capsules preferably contain the active substance as a granulate in admixture with lubricants such as talcum or magnesium stearate and, optionally, stabilisers such as sodium metabisulphite ($Na_2S_2O_5$) or ascorbic acid. In soft capsules, the active substance is preferably dissolved or suspended in suitable liquids such as liquid polyethylene glycols, whereby stabilisers can also be added.

Further suitable preparations for percutaneous administration are, e.g., lotions, tinctures and ointments.

The following examples further illustrate the nature of the present invention but they should not be construed as a limitation on the scope thereof. The temperature is given in degrees Centigrade.

EXAMPLE 1

To a stirred suspension of 37 g of finely ground phenylbutazone in water are added 5 g of solid sodium hydroxide. Stirring is continued at room temperature for about half an hour until a clear solution is obtained, whereupon 100 g of glycerin are added. The solution is stirred and slowly cooled to −2°. After about 4 hours, 46.1 g (91 percent of theory) of crystalline phenylbutazone-sodium-monoglycerate are separated by filtration or centrifugation; M.P. 205°–210°.

EXAMPLE 2

2.3 g of sodium are dissolved in 100 ml of isopropanol. 30.8 g of phenylbutazone are added at 80° and to the obtained clear solution are added 9.2 g of glycerin, whereupon crystallisation immediately occurs. After cooling to 5°, the crystals are filtered with suction, washed with ice cold isopropanol and dried at 60° under 0.1 Torr. 33.7 g of phenylbutazone-sodium-monoglycerate, M.P. 205°–210°, are obtained.

EXAMPLE 3

9.2 g of glycerin are added, while stirring and at room temperature, to 100 ml of isopropanol. 30.8 g of phenylbutazone and 4 g of sodium hydroxide are then added and the reaction mixture is heated, while stirring, to 80°. Upon cooling, phenylbutazone sodium-monoglycerate crystallises out from the clear solution. 32.4 g are obtained, M.P. 205°–210°.

EXAMPLE 4

Purification of the crude product, obtained according to examples 1, 2 and 3, can be carried out as follows:

46.1 g of crystalline product are suspended, while stirring, in 250 g of isopropanol and 85 g of methanol and refluxed for one-half hour, whereby a clear yellowish solution is obtained. Whilst stirring, the solution is slowly cooled and the phenylbutazone-sodium-monoglycerate thereby commences to crystallise at 27°. After stirring for several hours with further cooling, the white crystals are centrifuged and washed with cooled isopropanol. By this means are obtained 43.1 g of product, M.P. 205°–210°.

The following prescriptions further illustrate production of the pharmaceutical compositions.

EXAMPLE 5

137 g of phenylbutazone-sodium-monoglycerate are mixed with 2.2 g of highly dispersed silicon dioxide, 118.4 g of lactose and 4.4 g of magnesium stearate in a suitable mixer to obtain a homogeneous powder. If necessary, the mixture is put through a sieve to attain a uniform particle size and again mixed. The mixture is filled into 1,000 hard capsules in the usual manner. Each capsule contains 262 mg of the pulverulent mixture and 137 mg of active substance.

EXAMPLE 6

1370 g of phenylbutazone-sodium-monoglycerate are mixed with 1096 g of secondary calcium phosphate, 1096 g of lactose, 1370 g of maize starch and 109.6 g of highly dispersed silicon dioxide in a suitable mixture to obtain a homogeneous powder.

1,096 g of a suitable binder (e.g. Amijel Boll.) are mixed with hot water at 60° to form a paste of 6.67 percent by weight. This paste is then granulated together with the powder produced as described above and, if necessary, water is added. The moist granulate is granulated through a sieve No. III (Ph.Helv.V), dried in a suitable drier at 40° to obtain a moisture content of 1–3 percent, and then put through a sieve No. III–IIIa. 32.9 g of magnesium stearate, 32.9 g of highly dispersed silicon dioxide and 263 g of maize starch are added and the whole is mixed for 10 minutes. The mixture is pressed into 10,000 tablets, each weighing 548 mg and each containing 137 mg of active substance. Optionally, the tablets can be provided with grooves for finer adjustment of the dosage amount.

What we claim is:

1. A pharmaceutical composition comprising an antiinflammatory effective amount of phenylbutazone-sodium-monoglycerate and a pharmaceutically acceptable diluent or carrier therefor.

2. The method of producing an anti-inflammatory effect in a mammal comprising administering to said mammal an effective amount of phenylbutazone-sodium-monoglycerate.

* * * * *